Dec. 19, 1939.   E. F. PAWSAT   2,183,822
CARRIER AND MOUNTING THEREFOR
Filed March 11, 1938
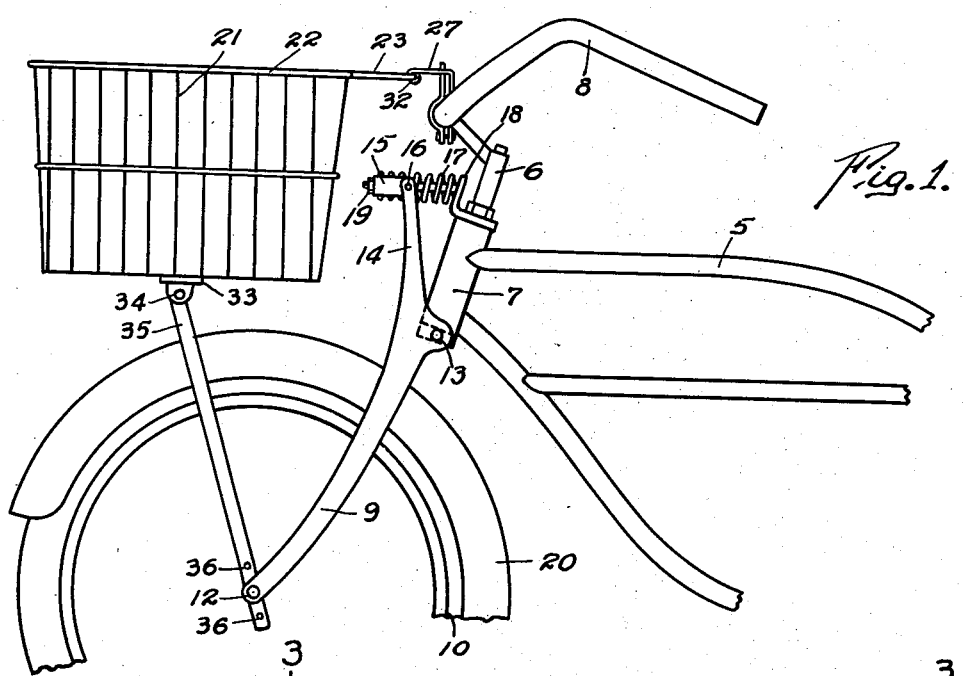
Fig. 1.
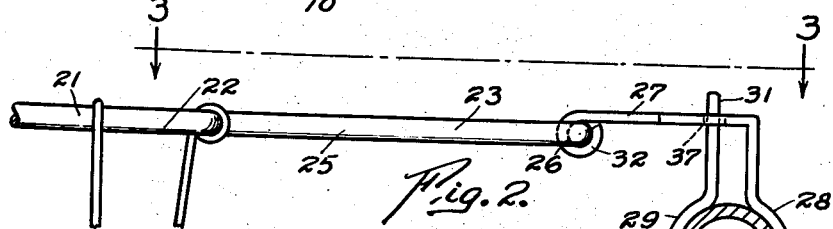
Fig. 2.
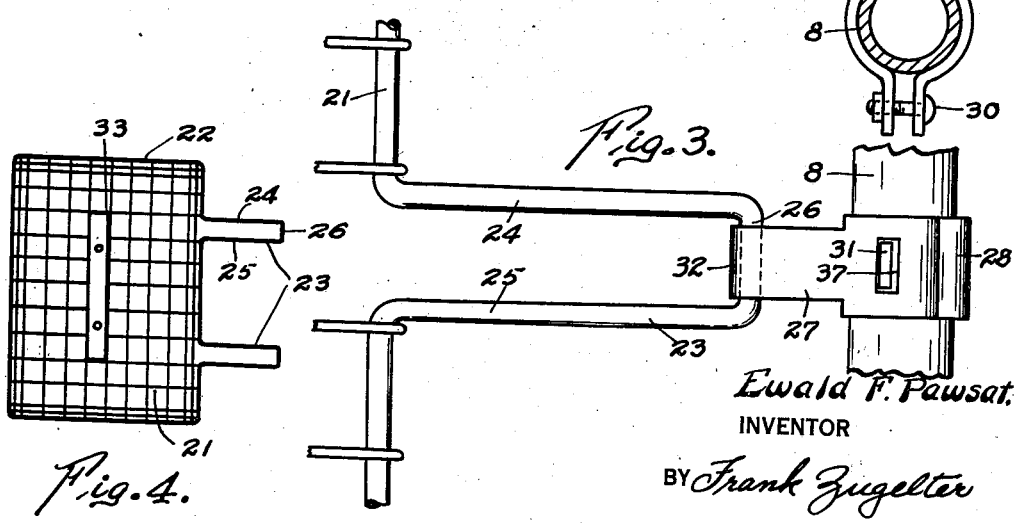
Fig. 3.
Fig. 4.
Ewald F. Pawsat
INVENTOR
BY Frank Zugelter
ATTORNEY Patented Dec. 19, 1939

2,183,822

UNITED STATES PATENT OFFICE 2,183,822

CARRIER AND MOUNTING THEREFOR

Ewald F. Pawsat, Maysville, Ky., assignor to Wald Mfg. Co., Inc., Maysville, Ky., a corporation of Kentucky Application March 11, 1938, Serial No. 195,358

2 Claims. (Cl. 224—36)

This invention relates to a carrier or basket, and means for mounting it upon a bicycle or similar vehicle.

An object of the invention is to provide a novel form of basket or carrier and mounting means therefor, which are so constructed and arranged as to prevent jarring and severe movement of a character tending to displace or inflict injury upon articles transported in the basket.

Another object of the invention is to provide simple, effective, and inexpensive means for accomplishing the purposes above stated, with the view also of providing for easy attachment and adjustment of the basket or carrier upon a bicycle or similar conveyance.

More specifically, it is an object of the invention to improve upon a carrier or basket structure by distributing shock and movement, incident to bicycle travel, through the agency of a certain form of hinge mounting which has proven more satisfactory than others heretofore attempted.

The foregoing and other objects are attained by the means described herein and disclosed in the accompanying drawing, in which:

Fig. 1 is a fragmental elevational view of the device of the invention applied to a bicycle or similar vehicle.

Fig. 2 is an enlarged cross-sectional view taken transversely through the handle bar of the bicycle shown in Fig. 1.

Fig. 3 is a fragmental plan view taken on line 3—3 of Fig. 2.

Fig. 4 is a top plan view of the carrier or wire basket disclosed in Fig. 1.

With reference to the accompanying drawing, 5 indicates the frame of a bicycle or similar vehicle having a steering post 6, a housing 7 therefor, and a handle bar 8. The type of vehicle illustrated is provided with a fork 9 supporting the wheel 10 upon an axle 12, said fork being pivoted at 13 related to the steering post housing or some adjacent portion of the frame in accordance with common practice. Above the pivot 13 is an upwardly extending pair of arms 14 carrying a bracket 15, pivoted as at 16, to support a shock absorber spring 17. One end of the spring bears against a bracket 18 which is rotatable with the steering post, while the opposite end bears against the member 15, as indicated. An adjusting screw 19 may be furnished to vary the compressive force of the spring. All of the foregoing is known structure, and need not therefore be described in greater detail. The character 20 indicates the fender of the bicycle.

A suitable basket or carrier to be applied to a bicycle, is indicated generally by the character 21, and, as is customary, such carrier or basket is constructed of wire. The basket or carrier preferably is rectangular, as indicated in Fig. 4, and comprises a continuous circumferential main frame element 22 formed of heavy wire or rod stock. As will be understood, the main frame element is located, preferably, at the top of the basket or carrier and defines the mouth thereof.

As will be readily evident by referring to Fig. 4, the main frame element diverts from the generally rectangular formation, to provide a pair of integral elongated U-shaped connectors 23, consisting of the spaced peripheral legs 24 and 25 joined by a transverse connecting portion 26. These connectors preferably extend rearwardly of the basket proper in the plane of the main frame element. The functions of the pair of connectors 23 are to furnish a hinge element, and to maintain a predetermined spacing of the basket from the handle bars of the bicycle. It should be noted that the connectors 23 are rigidly associated with the basket, and by preference, they are integral with the main frame element 22.

As is best shown in Figs. 2 and 3, the handle bar 8 is adapted to carry a hinge member 27 complementary to the hinge member 23, for supporting the basket for bodily movement such as will result from the rocking action of the pivoted fork 9. Said complementary hinge may be furnished by providing a bracket comprising two parts 28 and 29 to be fastened about the handle bar and fixed securely thereto by means of a bolt or the like 30. The bracket part 29 may terminate in an upstanding lug 31 extending through an aperture 37 formed in the bracket part 28. A forwardly extending portion 27 of part 28 may be developed to form a hinge eye 32 adapted to rotatably support the transverse portion 26 of the U-shaped connector 23.

With further reference to the basket or carrier, it may be stated that a plurality of crossed wires, preferably of lighter gauge than the main frame element, is formed to provide the sides and bottom in the customary manner. The bottom may carry a metallic strap 33 to which may be secured an inverted U-shaped bracket 34 to which is pivotally attached a brace 35 that extends downwardly to the fork 9 which supports the brace. The lower end of the brace may be pivotally mounted upon the axle 12, using any one of the holes 36 for adjusting the height of the basket or carrier. The brace 35 may be duplicated at the opposite side of the vehicle, and receive its support from the opposite leg of the fork.

By loosening the fastener 30 and rotating the entire bracket 28—29 upon the handle bar, a desired level of the basket may be established. As will be understood, two brackets such as 28—29 are contemplated, one to engage each of the U-shaped connectors 23 of the basket or carrier.

While the carrier and mounting therefor herein disclosed is particularly adapted for use upon a bicycle or similar vehicle having a spring mounted shock-absorbing steering fork, it is nevertheless applicable also to other and more common constructions. In some instances, the number of connectors 23 may be decreased or increased, as desired, and the brace 35 and bracket 28—29 may be modified for various reasons. In the employment of a single connector such as 23, a single complementary hinge element corresponding to the part 27 may be secured to the steering post or any adjacent part that moves therewith. The term "hand actuated steering element," where used herein, refers to the handle bar and all parts such as 6 which move with it. Various other modifications and changes in the structural details may be made, within the scope of the appended claims, without departing from the spirit of the invention.

What is claimed is:

1. A carrier for application to a cycle having a front wheel fork and a handle bar, said carrier comprising a basket having a bottom, side walls and end walls, a substantially circumferential frame element on the basket defining the top opening of the basket, said frame element along one side wall of the basket being bent outwardly a substantial distance away from the basket and into close proximity with the handle bars at two locations, to provide a pair of U-shaped integral hinge elements spaced apart and each comprising a pair of substantially parallel arms and a connecting portion joining the arms remotely from the basket, a pair of clamps attachable rigidly to the handle bars at opposite sides of the middle point of the handle bars, each of said clamps comprising an integral short support arm offset and extending from the clamp for disposition at a horizontal elevation different from the elevation of the handle bar, whereby reversal of the clamp upon the handle bar changes the elevation of said support arm, a hinge eye on each support arm close to the handle bar for loosely receiving the remote connecting portions of the basket hinge elements, and brace means for connecting the basket bottom to a cycle fork.

2. A carrier for application to a cycle having a front wheel fork and a handle bar, said carrier comprising a basket having a bottom, side walls and end walls, a substantially circumferential frame element on the basket defining the top opening of the basket, said frame element along one side wall of the basket being bent outwardly away from the basket, the bends being duplicated at opposite sides of the middle point of the basket side wall and each comprising a pair of substantially parallel arms and a connecting portion, with the individual connecting portions joining their respective pairs of arms at a location sufficiently remote from the basket to substantially reach the region of the cycle handle bar, said connecting portions being separated from one another but aligned in substantially the plane of the basket frame element, a pair of clamps attachable rigidly and non-shiftably upon the handle bar at locations removed from and at opposite sides of the middle point of the handle bar, the space between said clamps corresponding to the space between the individual connecting portions of the pairs of basket frame arms, said clamps each comprising a forwardly extended arm having a free end overlying the handle bar at an elevation above it, whereby fixation of the clamps at different degrees of rotation upon the handle bar will change the elevation of the arms, and a hinge eye on the free end of each clamp arm for rotatably supporting the connecting portions of the basket frame arms.

EWALD F. PAWSAT.